(12) United States Patent
Müller et al.

(10) Patent No.: US 7,847,057 B2
(45) Date of Patent: Dec. 7, 2010

(54) PAEK POWDER, IN PARTICULAR FOR THE USE IN A METHOD FOR A LAYER-WISE MANUFACTURING OF A THREE-DIMENSIONAL OBJECT, AS WELL AS METHOD FOR PRODUCING IT

(75) Inventors: Frank Müller, Fürstenfeldbruck (DE); Andreas Pfister, München (DE); Martin Leuterer, Olching (DE)

(73) Assignee: EOS GmbH Electro Optical Systems (DE)

( * ) Notice: Subject to any disclaimer, the term of this patent is extended or adjusted under 35 U.S.C. 154(b) by 0 days.

(21) Appl. No.: 12/061,831

(22) Filed: Apr. 3, 2008

(65) Prior Publication Data

US 2008/0258330 A1    Oct. 23, 2008

(30) Foreign Application Priority Data

Apr. 5, 2007    (DE) .................. 10 2007 016 656

(51) Int. Cl.
*C08F 6/00* (2006.01)
*C08J 3/00* (2006.01)

(52) U.S. Cl. .............. 528/502; 264/113; 428/402; 528/125

(58) Field of Classification Search .......... 264/113; 428/402; 528/125, 502
See application file for complete search history.

(56) References Cited

U.S. PATENT DOCUMENTS

| 5,730,925 A | 3/1998 | Mattes et al. |
| 2006/0134419 A1* | 6/2006 | Monsheimer et al. ....... 428/402 |
| 2007/0267766 A1 | 11/2007 | Hesse et al. |

FOREIGN PATENT DOCUMENTS

| EP | 1674497 B1 | 6/2006 |
| WO | 2005090448 A1 | 9/2005 |

* cited by examiner

*Primary Examiner*—Terressa M Boykin
(74) *Attorney, Agent, or Firm*—McDonnell Boehnen Hulbert & Berghoff LLP

(57) ABSTRACT

By a temper treatment a polyaryletherketone powder is processed such that it is particularly suited for the use in a method for a layer-wise manufacturing of a three-dimensional object. To this effect the powder is tempered at a temperature that is at least 20° C. above the glass transition temperature for at least 30 minutes before it is used as building material.

13 Claims, 4 Drawing Sheets

PAEK POWDER, IN PARTICULAR FOR THE USE IN A METHOD FOR A LAYER-WISE MANUFACTURING OF A THREE-DIMENSIONAL OBJECT, AS WELL AS METHOD FOR PRODUCING IT

BACKGROUND OF THE INVENTION

The present invention is related to a polyaryletherketone (PAEK)-powder, which is particularly suited for the use in a rapid prototyping method, to a method for producing such a powder as well as to a rapid prototyping method for the manufacturing of a three-dimensional object, in which method this powder is used.

Methods, in which a quick manufacturing of prototype parts starting from construction data is possible, are referred to as rapid prototyping methods. Usually the part to be manufactured is built layer-wise from a shapeless material or a material that is neutral with respect to shape. For the case that the original material is in powder form, such methods are for example known under the names 3D-laser sintering, 3D-laser melting or 3D-printing. Here, metals, ceramics and last but not least plastics are used as basic materials. For instance, U.S. Pat. No. 5,730,925 describes a laser sintering method, in which layers of a powder are applied onto a support that can be vertically moved and in which the layers are selectively sintered at the positions corresponding to the cross-section of the object to be manufactured by means of a laser.

FIG. 3 shows as an example a laser sintering device by means of which a method for a layer-wise manufacturing of a three-dimensional object may be performed. As is apparent from FIG. 3, the device comprises a container 1. This container is open to the top and is limited at the bottom by a support 4 for supporting an object 3 to be formed. By the upper edge 2 of the container (or by its sidewalls) a work plane 6 is defined. The object is located on the top side of the support 4 and is formed from a plurality of layers of a building material in powder form that can be solidified by means of electromagnetic radiation, which layers are in parallel to the top side of the support 4. The support may be moved in a vertical direction, i.e. in parallel to the sidewall of the container 1, via a height adjustment device. Thereby the position of the support 4 relative to the work plane 6 can be adjusted.

Above the container 1 or rather the work plane 6 an application device 10 is provided for applying the powder material 11 to be solidified onto the support surface 5 or a previously solidified layer. Also, an irradiation device in the form of a laser 7, which emits a directed light beam 8, is arranged above the work plane 6. This light beam 8 is directed as deflected beam 8' towards the work plane 6 by a deflection device 9 such as a rotating mirror.

When the three-dimensional object 3 is manufactured, the powder material 11 is applied layer-wise onto the support 4 or a previously solidified layer and is solidified at the positions of each powder layer that correspond to the object by means of the laser beam 8'. After each selective solidification of a layer the support is lowered by the thickness of the powder layer to be subsequently applied.

The properties of the original powder material are selected depending on the desired properties of the part to be manufactured. However, as a rule a high bulk density as well as a sufficient pourability are of great significance. In order to guarantee a high accuracy of the details and a high surface quality of the objects to be manufactured, plastic powders are necessary that have an upper particle size limit of less than 150 μm and a fraction of 90% below 135 μm ($D_{0.9}$-value). Furthermore, the powder should not exceed a $D_{0.1}$-value of 32 μm in order to ensure a stable layer application. Also, a spherical grain shape of the powder particles is indispensable for ensuring a uniform and smooth powder bed surface and part surface. In addition, a small surface roughness of the particles, expressed as BET surface, has to be aimed at, because thereby the powder bed density is increased and built-up processes and degradation processes, which negatively affect the processability of the powder, are reduced.

Among plastic powders mainly polyaryletherketones are of interest. The reason is that parts that have been manufactured from PAEK powder or PAEK granulates are characterized by a low flammability, a good biocompatibility as well as a high resistance against hydrolysis and radiation. It is the thermal resistance also at elevated temperatures as well as the chemical resistance that distinguishes PAEK powders from ordinary plastic powders. Due to these properties there is a high demand for PAEK materials particularly in the aerospace industry, in the automotive industry and in the electronic industry as well as the medical industry. In particular, such a PAEK polymer powder may be a powder from the group consisting of polyetheretherketone (PEEK), polyetherketoneketone (PEKK), polyetherketone (PEK), polyetheretherketoneketone (PEEKK) or polyetherketoneetherketoneketone (PEKEKK).

Therefore, the great potential of the material PAEK in relation to a generative rapid prototyping method such as laser sintering is apparent. However, tests of the inventors using PAEK powders as they are used in conventional methods for manufacturing of parts showed that these powders are suitable for laser sintering only to a limited extent, because the above-mentioned requirements on the powder properties are not fulfilled:

In particular above already exposed areas it became obvious that the layer application leaves a lot to be desired with respect to uniformity and that the unevenness of an applied layer affected the accuracy of the manufacturing of the parts. An insufficient pourability as well as a bulk density of the powder that was too low were identified as reasons for this.

Furthermore, it was found that the powder bed density in the applied powder layer was very low. This was regarded as indication to the fact that the bulk density of the particles of the commercially available powder was not high enough. However, a small powder bed density prevents the formation of parts having a high density and strength.

SUMMARY OF THE INVENTION

In view of the drawbacks of PAEK powders that are available up to now an object of the invention is to provide a PAEK powder that is particularly suited for a generative method for a three-dimensional manufacturing of parts as well as a method for producing this powder. In particular, it should be possible to use the improved PAEK powder in a laser sintering method.

The object is achieved by a polyaryletherketone (PAEK)-fine powder, a method for producing a polyaryletherketone (PAEK)-fine powder and by a method for manufacturing a three-dimensional object according to the claimed embodiments of the invention.

DETAILED DESCRIPTION OF THE PREFERRED EMBODIMENTS

In order to process commercially available PAEK powder such that it is particularly suited for a rapid prototyping method, extensive test series were carried out by the inventors. Thereby it was found that the bulk density of the powder can be increased by carrying out a tempering of the powder before the use of the powder as building material. Also an improvement of the pourability could be proven.

Figure 1:
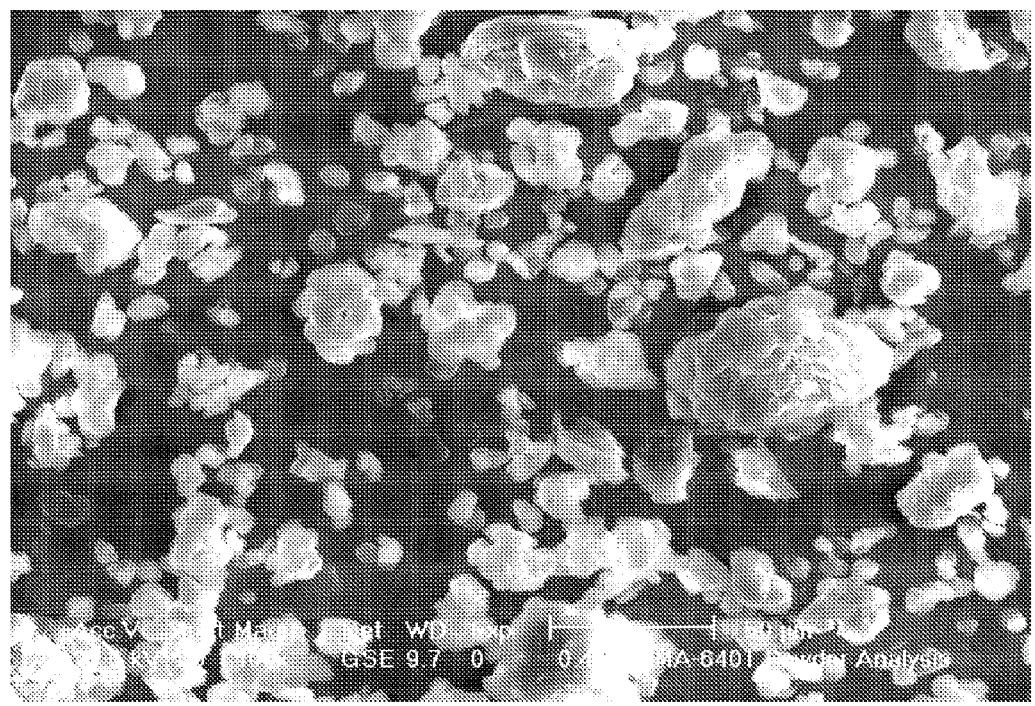
FIG. 1 shows a SEM-micrograph of PEEK powder (melt viscosity 0.15 kN*s/m$^2$, basic raw material for example 2) before the treatment according to the invention.
Figure 2:
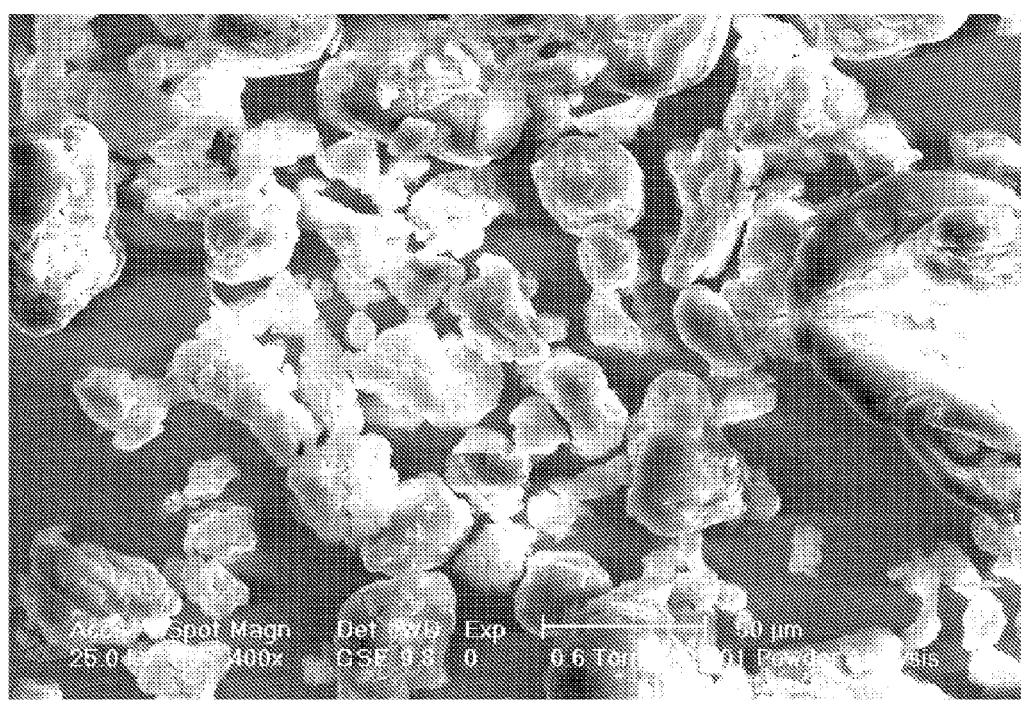
FIG. 2 shows a SEM-micrograph of PEEK powder (melt viscosity 0.15 kN*s/m², treated for 15 hours at 250° C. according to example 2) after the treatment according to the invention.

Furthermore, it was surprisingly found that by the thermal treatment of the fine powder also a reduction of the specific surface, characterized by the BET surface, occurs. In rapid prototyping a small BET surface is advantageous in so far as thereby the affinity of the powder to reactions and the deterioration of the powder may be reduced. As can be seen from the scanning electron microscope micrographs of FIGS. 1 and 2, a smoothing of the powder surface occurs. The BET values that can be achieved lie between 1 and 40 m²/g. It should be possible to reach even values down to 0.1 m²/g.

PAEK fine powder that is commercially available typically has a $D_{0.9}$-value of less than 150 μm. It is produced from a porous coarse powder by means of a cryogenic grinding method, in which the material during the grinding is cooled by means of liquid nitrogen. Alternatively the powder may have been produced by a precipitation method from a solvent by melt spraying or spray drying. Examples for commercially available powders are e.g. PEEK (polyetheretherketone)-powder of the series PF, XF and the Vicote-series of Victrex Plc, Thornton Cleveleys, Lancashire FY5 4QD, Great Britain.

Ideally the tempering temperature should be selected to be between the glass transition temperature and the melting point of the material. Significant effects already result, when the temperature is held for more than 30 minutes, better for more than 1 hour, at 20° C. above the glass transition temperature. For PEEK powder this value is approximately at 170° C. Though this tempering parameters are already sufficient for achieving an improvement of the bulk density, the result can be optimized for a certain powder material by means of test series that can be easily performed. The relationships that are to be taken into consideration are described in the following by means of examples:

In the examples the measured values for the bulk density were obtained according to DIN 53466. Before determining the bulk density, the powder was sieved by means of a sieving machine and a protective strainer having a mesh size of 212 μm (250 g powder batch, Retsch analytical sieve shaker AS200 basic) or 245 μm (powder batch larger than 250 g, vibrating screener 12110005 of the company Siebtechnik) in order to remove powder bakings that possibly are generated during the tempering. An electrostatic charging of the powder that is possibly generated by the sieving process is reduced by a resting of the powder at standard climatic conditions for 24 hours.

The melting points and the glass transition temperatures of the polymer powders were determined according to DIN 53765 by means of a DSC823 of the company Mettler-Toledo using nitrogen as circulating gas as well as a heating rate of 20K/min. The analysis of the standard enthalpy of fusion, the melting points and the glass transition temperature was carried out by means of the STARe Software Version 9.01. In the process the integration of the melting peaks of the first heating-up curve gives the enthalpy of fusion. The crystallinity can be calculated from an enthalpy of fusion of 130 J/g for a polyetheretherketone, which theoretically has 100% crystallinity, as described in the technical literature. This procedure is known to the skilled person for the analysis of the DSC curves.

The melt viscosity was determined by means of a capillary viscometer at 400° C. and 1000 s$^{-1}$ according to the test specification TM-VX-12 of the company Victrex plc.

Example 1

250 g at a time of a PEEK powder that is supplied by Victrex and has a melt viscosity of 0.15 kN*s/m² (bulk density=0.401 g/cm³) are tempered in each case in a 1000 ml beaker in a circulating air oven (type Nabertherm N250/A) for the time and duration specified in Table 1. The heating-up time to the tempering temperature is one hour. After the tempering the beakers are taken out of the oven, are cooled at room temperature and the bulk density is determined. The achieved increase of the bulk density is between 2% and 17%.

TABLE 1

|  | time [h] | 130° C. tempering temperature bulk density [g/cm³] | 200° C. tempering temperature bulk density [g/cm³] | 230° C. tempering temperature bulk density [g/cm³] | 250° C. tempering temperature bulk density [g/cm³] |
| --- | --- | --- | --- | --- | --- |
| PEEK 150 PF (250 g tempered in 1000 ml beaker) | 0 | 0.401 | 0.401 | 0.401 | 0.401 |
| | 2 | 0.41 | — | — | — |
| | 4 | 0.41 | — | — | — |
| | 6 | 0.41 | — | 0.45 | — |
| | 8 | 0.41 | 0.46 | 0.45 | — |
| | 10 | 0.41 | 0.45 | 0.45 | — |
| | 12 | 0.42 | 0.46 | 0.45 | — |
| | 14 | 0.42 | 0.46 | 0.45 | — |
| | 15 | — | — | — | 0.47 |
| | 16 | — | 0.46 | 0.45 | — |
| | 18 | — | 0.45 | 0.45 | — |
| | 20 | — | — | 0.45 | — |
| | 24 | 0.42 | — | 0.45 | — |

Example 2

7 kg at a time of a PEEK powder supplied by Victrex having a melt viscosity of 0.15 kN*s/m² (bulk density 0.401 g/cm³) in each case are tempered in a metal container in a circulating air oven (type Nabertherm N250/A) for the time and duration specified in Table 2. The heating-up time to the tempering temperature is one hour. After the tempering the metal containers are removed from the oven and are cooled at room temperature. The achieved increase of the bulk density lies between 5% and 19%.

TABLE 2

|  | time [h] | 250° C. tempering temperature bulk density [g/cm³] | 260° C. tempering temperature bulk density [g/cm³] | 270° C. tempering temperature bulk density [g/cm³] |
|---|---|---|---|---|
| PEEK 150PF (7 kg tempered in a metal container) | 0 | 0.401 | | |
| | 2 | 0.422 | | |
| | 4 | 0.422 | | |
| | 6 | 0.435 | | |
| | 8 | 0.439 | | |
| | 10 | 0.445 | | |
| | 15 | 0.454 | 0.462 | |
| | 20 | | 0.453 | |
| | 21 | 0.449 | | |
| | 23 | 0.452 | | |
| | 25 | 0.454 | | |
| | 27 | 0.453 | | |
| | 29 | 0.461 | | |
| | 96 | | | 0.479 |

Example 3

250 g at a time of a PEEK powder supplied by the company Victrex having a melt viscosity of 0.45 kN*s/m² (bulk density=0.318 g/cm³) in each case are tempered in a 1000 ml beaker in a circulating air oven (type Nabertherm N250/A) for the time and duration specified in Table 3. The heating-up time to the tempering temperature is one hour. After the tempering the beakers are removed from the oven, are cooled at room temperature and the bulk density is determined. The achieved increase of the bulk density lies between 4% and 9%.

TABLE 3

|  | time [h] | 310° C. tempering temperature bulk density [g/cm³] | 320° C. tempering temperature bulk density [g/cm³] |
|---|---|---|---|
| PEEK 450PF (250 g tempered in a beaker) | 0 | 0.318 | 0.318 |
| | 16 | 0.346 | 0.330 |
| | 24 | 0.343 | 0.331 |
| | 47 | 0.347 | — |

Example 4

7 kg at a time of a PEEK powder supplied by Victrex having a melt viscosity of 0.45 kN*s/m² (bulk density 0.340 g/cm³) in each case are tempered in a metal container in a circulating air oven (type Nabertherm N250/A) for 20 hours at 290° C. The heating-up time to the tempering temperature is one hour. After the tempering the metal containers are taken out of the oven and cooled at room temperature. The determined bulk density is 0.395 g/cm³. The achieved increase of the bulk density lies at 16%.

Example 5

7 kg at a time of a PEEK powder supplied by Victrex having a melt viscosity of 0.09 kN*s/m² (bulk density 0.42 g/cm³) in each case are tempered in a metal container in a circulating air oven (type Nabertherm N250/A) for 15 h at 250° C. The heating-up time to the tempering temperature is one hour. After the tempering the metal containers are removed from the oven and are cooled down at room temperature. The determined bulk density is 0.47 g/cm³. The achieved increase of the bulk density lies at 12%.

Example 6

250 g at a time of a PEEK powder supplied by Victrex having a melt viscosity of 0.15 kN*s/m² (bulk density 0.401 g/cm³) in each case are tempered in a 1000 ml beaker in a circulating air oven (type Nabertherm N250/A) for the time and duration specified in Table 4. The heating-up time to the tempering temperature is one hour. After the tempering the beakers are removed from the oven and cooled down at room temperature. Then, the bulk density and the enthalpy of fusion are determined. The achieved increase of the bulk density lies between 10% and 16%. The achieved increase of the crystallinity lies between 13% and 19%.

TABLE 4

| material | tempering temperature | tempering time | bulk density [g/cm³] | enthalpy of fusion DSC [J/g] | crystallinity-DSC [%] |
|---|---|---|---|---|---|
| 150PF | — | — | 0.401 | 60.4 | 46.5 |
| 150PF | 200° C. | 12 h | 0.448 | | |
| 150PF | 200° C. | 24 h | 0.448 | 69.0 | 53.1 |
| 150PF | 250° C. | 12 h | 0.453 | | |
| 150PF | 250° C. | 24 h | 0.454 | 68.4 | 52.6 |
| 150PF | 300° C. | 12 h | 0.462 | | |
| 150PF | 300° C. | 24 h | 0.464 | 71.7 | 55.2 |
| 150PF | 320° C. | 12 h | 0.446 | | |
| 150PF | 320° C. | 24 h | 0.443 | 70.7 | 54.4 |

Figure 4:
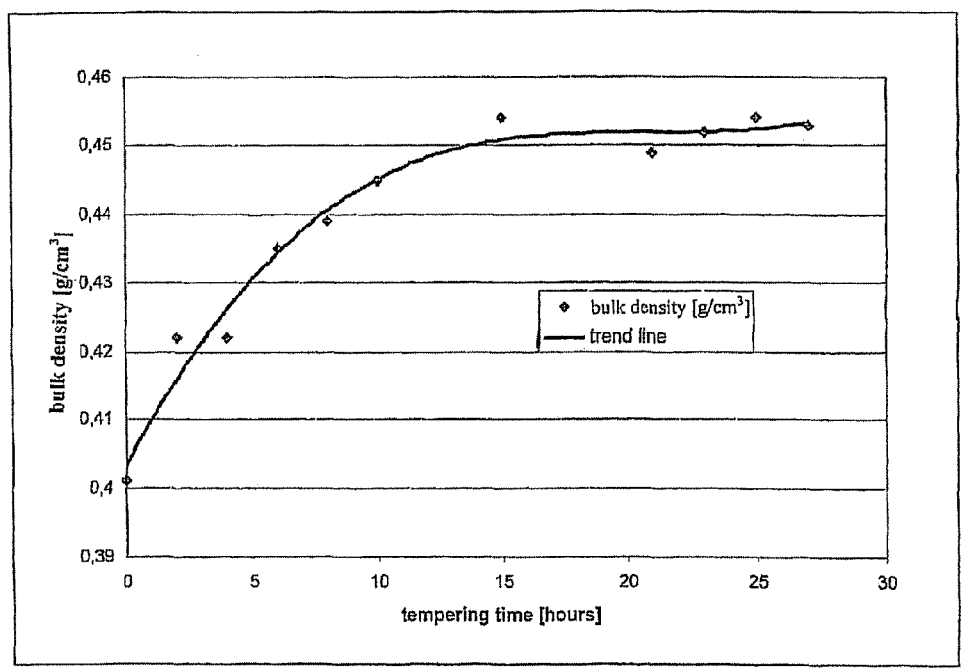

Based on the above examples 1 to 6 the following arises:

For a given tempering temperature the bulk density rises, when the duration of treatment rises, until a nearly constant level has been reached (see for this Table 2 and FIG. 4 based on which it can be seen that for a tempering temperature of 250° C. the bulk density increases during the first 10 hours of the treatment by 0.044 g/cm³, whereas for the second 10 hours of treatment it only increases by approximately 0.016 g/cm³.

Furthermore, the higher the temperature of the thermal treatment the higher the rate by which the bulk density increases. The higher the temperature is set the shorter is the period until a constant level of the bulk density is reached (compare for this the progress in Table 1 for 130° C. with the progress in Table 2 for 250° C.). A treatment that is still more efficient is also possible when the temperature is set such that it is more than 20° C. above the glass transition temperature (which is 143° C. for PEEK (manufacturer information Victrex)) such as approximately 50° C. or approximately 100° C. above the glass transition temperature.

Furthermore, it can be seen from the progress for 130° C. in Table 1 that an inefficient process results when the temperature is set such that it is below the glass transition temperature. Moreover, it can be seen that even for this case a modified bulk density results for a treatment duration of 2 h.

It is important to choose the temperature such that it is not too close to the melting point of the powder. Otherwise a partial agglutination of the powder may occur, which leads to a smaller increase of the bulk density than for a lower temperature. This can be clearly seen for example in Table 3, where lower values of the bulk density are achieved for a tempering temperature of 320° C. than for a tempering temperature of 310° C. Therefore, in order to be on the safe side, the tempering temperature should be set to 20° C. below the melting point, determined by means of differential scanning calorimetry (DSC) according to DIN 53765, better to 30° C. below the melting point.

Furthermore, the temperature and duration of the thermal treatment are also dependent on the melt viscosity. The higher the melt viscosity, the higher the temperature should be for achieving an efficient increase of the bulk density. With respect to this it can be seen from FIG. 4 that for a starting powder having a melt viscosity of 0.15 kN*s/m² a plateau value for the bulk density is reached after 15 hours of treatment at a tempering temperature of 250° C. For a starting powder having a melt viscosity of 0.45 kN*s/m² for these tempering conditions a plateau value has not yet been reached. This results from the following reference example 4a:

Reference Example 4a 7 kg at a time of a PEEK powder supplied by Victrex having a melt viscosity of 0.45 kN*s/m² (bulk density=0.340 g/cm³) in each case are tempered in a metal container in a circulating air oven (type Nabertherm N250/A) for 15 h at 250° C. The heating-up time to the tempering temperature is one hour. After the tempering the metal containers are removed from the oven and cooled down at room temperature. The determined bulk density is 0.379 g/cm³. The achieved increase of the bulk density lies at 11%.

When this result is compared to the one of Example 4, where the same powder had been tempered for 20 hours at 290° C., it can be seen that in Example 4a it is not possible that a plateau value has already been reached for the powder having a melt viscosity of 0.45 kN*s/m², because the conditions of Example 4 still enable a remarkable increase of the bulk density from 0.379 g/cm³ to 0.395 g/cm³.

Moreover, for a given duration and temperature of the thermal treatment the bulk density that can be achieved may be slightly smaller for larger amounts of powder. This can be seen from a comparison of Tables 1 and 2: while in Table 1 for T=250° C. and an amount of powder of 250 g a bulk density of 0.47 g/cm³ had been achieved after a treatment time of 15 hours, in Table 2 for an amount of 7 kg of the same powder merely a value of 0.454 g/cm³ was achieved.

Furthermore, it was observed that by the thermal treatment an increase of the crystallinity—determined via the enthalpy of fusion by means of a differential scanning calorimetry (DSC) or by means of a wide angle X-ray scattering (WAXS)—occurs. A high enthalpy of fusion and a high crystallinity, respectively, are particularly advantageous for a laser sintering of the powder. The reason for this is that when a region is irradiated by means of the laser beam, powder particles adjacent to the region are also fused at their surfaces due to the heat conduction of the material. In this context a high enthalpy of fusion and a high crystallinity, respectively, hamper the surface-fusion of the adjacent powder particles. When thereby a sintering process outside of the desired region is prevented, the resolution of details of the sintered parts is improved.

The increase of the crystallinity can for example be derived from Table 4.

Though, as mentioned above, a treatment temperature as high as possible is important for the efficiency of the method, on the other hand the temperature of the thermal treatment preferably should be selected such that an improvement of the powder parameters is achieved by a temperature as low as possible and a duration as short as possible of the thermal treatment. The reason is that a thermal and oxidative damage of the powder material during the tempering treatment shall be avoided or reduced to an amount as small as possible. In order to avoid a damage of the powder and still keep the duration of treatment of the powder short, so that the method is cost-effective, it can be therefore advantageous to perform the thermal treatment under an inert gas atmosphere (e.g. nitrogen or argon) or under a vacuum.

Though in the above examples an oven was used for the tempering treatment, of course the thermal energy may be supplied to the powder also in any alternative way. For instance, the powder can be exposed to electromagnetic radiation or to particle radiation. In particular, IR radiation or microwave radiation may be used for this. As the following Example 7 shows, a temperature increase can also be achieved by a mechanical action on the powder. In the example the adjustment of the temperature is effected for example via the agitator speed:

Example 7

10 kg of a PEEK powder supplied by Victrex having a melt viscosity of 0.15 kN*s/m² (bulk density=0.401 g/cm³) are after-treated in a commercially available mixer by a shear mixing. Here, the mixer speed is set such that the powder heats up to 150° C. within 25 min. Then, the mixer speed is lowered by such an amount that the temperature can be kept constant at 150° C. for a further time period of 25 min. Subsequently the powder is heated up to 170° C. within 20 min by increasing again the mixer speed. Finally the mixer speed is lowered by such an amount that the temperature can be kept constant at 170° C. for a further time period of 60 min.

After the powder has left the mixer, it is sieved by a screening machine (vibrational screening machine 12110005 of the company Siebtechnik) through a protective strainer having a mesh size of 245 µm in order to remove powder bakings that possibly were produced by the tempering. The bulk density that was determined is 0.48 g/cm³. The achieved increase of the bulk density lies at 19.7%.

A mechanical treatment can also be performed in order to assist another supply of thermal energy to the powder. In this case a particularly large increase of the bulk density can be achieved already with a moderate tempering temperature and treatment duration.

A polyaryletherketone fine powder in general above was specified as starting material to be treated. In particular, such a polymer powder may be a powder from the group polyetheretherketone (PEEK), polyetherketoneketone (PEKK), polyetherketone (PEK), Polyetheretherketoneketone (PEEKK) or polyetherketoneetherketoneketone (PEKEKK).

Furthermore, in the treatment the PAEK powder need not be present in its purest form. Rather, one or more additives may have been added. Here, fillers such as fibers (carbon fibers, glass fibers, Kevlar fibers, carbon nano fibers (carbon nano tubes) . . . ) or fillers having a low aspect ratio (glass beads, aluminum grit, etc.) or mineral fillers such as titaniumdioxide or process additives (e.g. free flowing agents such as the ones from the Aerosil series (e.g. Aerosil R974, Aerosil 200)), heat stabilizers, oxidation stabilizers, color pigments (carbon black, graphite, etc.)) are possible as additives. Furthermore, the filler need not be present as separate powder component, but can also have been worked into the PAEK powder (e.g. by means of a fusion joining).

Figure 3:
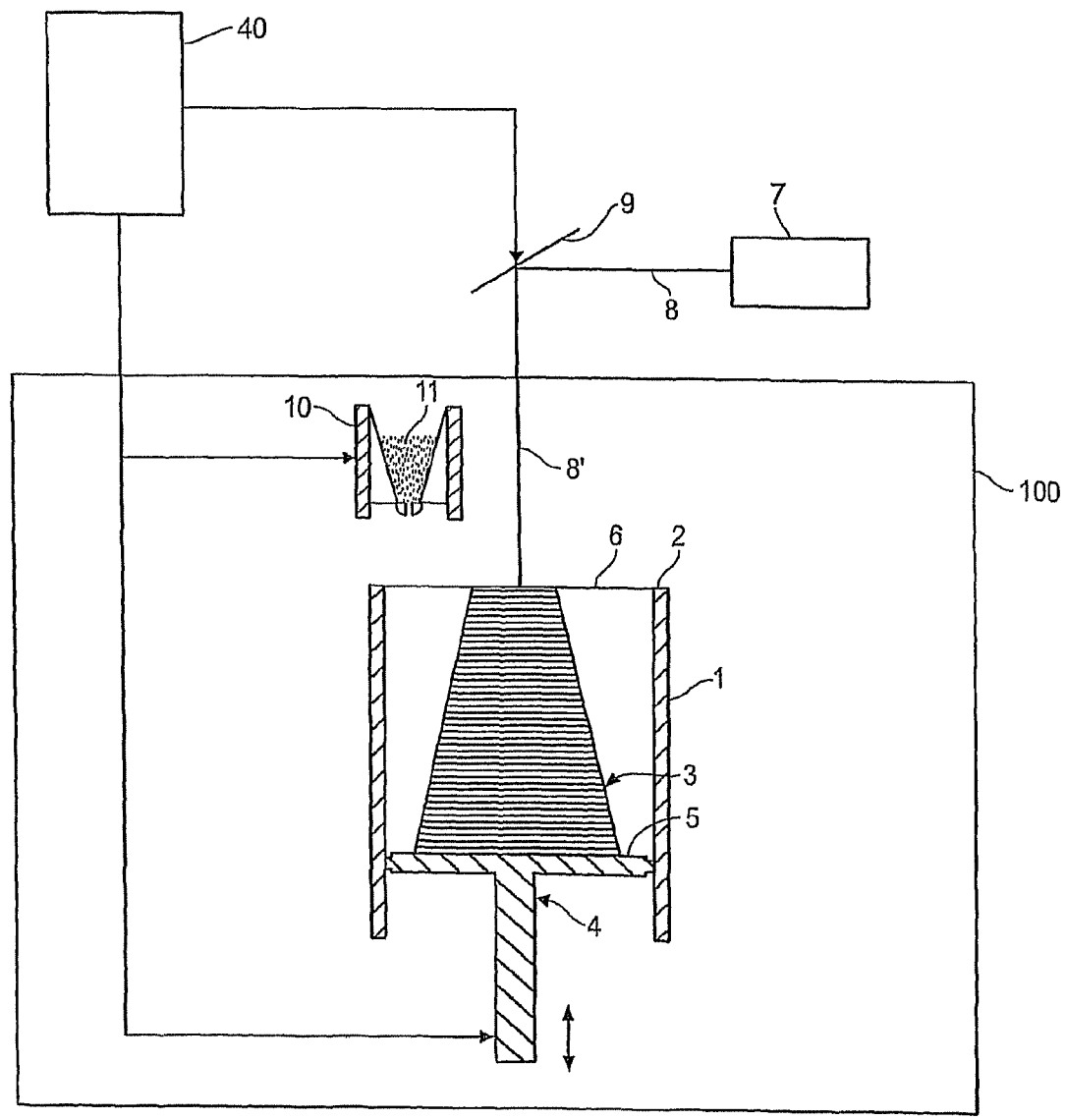
FIG. 3 shows a laser sintering device for a layer-wise manufacturing of a three-dimensional object and FIG. 4 is a diagram that shows the increase of the bulk density in dependence of the tempering time at a constant temperature (PEEK powder having a melt viscosity of 0.15 kN*s/m², tempered at 250° C. according to embodiment 2).

The PAEK powders obtained according to the invention are particularly suited for a use in a laser sintering device as it is for example shown in FIG. 3. However, the use is not limited to a laser sintering device. Rather, energy can be supplied also in the form of different electromagnetic radiations (including heat radiation). Moreover, in the manufacturing of the three-dimensional object the powder can also be completely melted. Finally a solidification of the powder can also be effected by adding a binder (3D-printing).

In a laser sintering machine of the type P700 that has been modified by EOS for high temperature applications, the powder of Example 2 (tempered at 250° C. for 15 hours) was used in a laser sintering process at a construction space temperature of 335° C. Sample geometries with the dimension 150× 20×4 mm (length, width, height) may be manufactured, which have a part density of 1.316 g/cm$^3$ (ISO 1133). With a density of 1.30-1.31 g/cm$^3$ for injection molded PEEK components that is specified by Victrex plc., thus a density of the laser-sintered parts of 100% may be assumed.

The untreated powder of Example 2 (bulk density=0.401 g/cm$^3$) could not be processed to comparable parts due to a lacking pourability and an inhomogeneous layer application.

A pre-treatment of the PAEK powder before the use as building material in a device for a layer-wise manufacturing of a three-dimensional object such as a laser sintering device, of course can also be provided directly in the device for a layer-wise manufacturing. For this, merely a suitable heating device has to be provided, for example in the form of heating pipes around the powder supply container.

The invention claimed is:

1. Method for producing a polyaryletherketone (PAEK) powder for layered manufacturing of a three-dimensional part, comprising:
   exposing a PAEK fine powder, which has been manufactured by grinding, or a precipitation process from a solvent, or melt spraying or spray drying from a coarse powder or granulate, to a temperature T that lies at least 20° above the glass transition temperature determined by means of DSC according to DIN 53765 for a period that is longer than 30 min.

2. Method according to claim 1, in which the temperature T is selected to be at least 50° C. above the glass transition temperature Tg of the powder determined by means of differential scanning calorimetry (DSC) according to DIN 53765.

3. Method according to claim 1, in which the temperature T is selected to be below the melting point $T_S$ of the powder determined by means of differential scanning calorimetry (DSC) according to DIN 53765.

4. Method according to claim 3, in which the temperature T is selected to be 20° C. below the melting point $T_S$ of the powder determined by means of differential scanning calorimetry (DSC) according to DIN 53765.

5. Method according to claim 3, in which the temperature T is selected to be 30° C. below the melting point $T_S$ of the powder determined by means of differential scanning calorimetry (DSC) according to DIN 53765.

6. Method according to claim 1, in which the powder is exposed to the temperature T by irradiating it with electromagnetic radiation or particle radiation.

7. Method according to claim 6, in which the powder is exposed to the temperature T by irradiating it with IR-radiation or microwave-radiation.

8. Method according to claim 6, in which a portion of the supplied thermal energy for reaching and keeping the temperature T is supplied to the powder by means of a mechanical treatment.

9. Method according to claim 7, in which a portion of the supplied thermal energy for reaching and keeping the temperature T is supplied to the powder by means of a mechanical treatment.

10. Method according to claim 1, in which the PAEK fine powder that is used as starting material comprises a powder from the group polyetheretherketone (PEEK), polyetherketoneketone (PEKK), polyetherketone (PEK), polyetheretherketoneketone (PEEKK) or polyetherketoneetherketoneketone (PEKEKK).

11. Method according to claim 1, wherein at least one additive is added to the PAEK fine powder as further component.

12. Method according to claim 11, wherein the additive is worked into the powder by means of a fusion joining.

13. Method according to claim 1, wherein the treatment of the starting powder is performed under an inert gas atmosphere.

* * * * *